(12) United States Patent
Fukuma et al.

(10) Patent No.: US 8,329,354 B2
(45) Date of Patent: Dec. 11, 2012

(54) EJECTOR AND FUEL CELL SYSTEM USING THE SAME

(75) Inventors: Kazunori Fukuma, Saitama (JP); Satoshi Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 535 days.

(21) Appl. No.: 12/706,371

(22) Filed: Feb. 16, 2010

(65) Prior Publication Data

US 2010/0209819 A1 Aug. 19, 2010

(30) Foreign Application Priority Data

Feb. 17, 2009 (JP) ................................ 2009-034481

(51) Int. Cl.
 *H01M 8/04* (2006.01)
 *G05D 11/00* (2006.01)
 *F04F 5/00* (2006.01)

(52) U.S. Cl. ........ 429/444; 429/446; 137/111; 137/510; 417/178

(58) Field of Classification Search .................. 429/444, 429/446; 137/111, 510; 417/178
See application file for complete search history.

(56) References Cited

U.S. PATENT DOCUMENTS

2008/0199746 A1  8/2008  Kobayashi et al.

FOREIGN PATENT DOCUMENTS

| JP | 2002-56868  | 2/2002  |
| JP | 2002-227799 | 8/2002  |
| JP | 2004-44411  | 2/2004  |
| JP | 2004-95528  | 3/2004  |
| JP | 2005-337101 | 12/2005 |

OTHER PUBLICATIONS

European Search Report for Application No. 10153655.5, dated Sep. 21, 2010.

*Primary Examiner* — Patrick Ryan
*Assistant Examiner* — Julian Anthony
(74) *Attorney, Agent, or Firm* — Nelson Mullins Riley & Scarborough LLP; Anthony A. Laurentano

(57) ABSTRACT

An ejector and a fuel cell system using the ejector which can improve a control of an ejection pressure of a fluid.
The ejector 50 includes a body 60, a nozzle 80, a needle 70, a diffuser 90 which sucks a second fluid by a negative pressure generated by a first fluid ejected from the nozzle 80, and a first, a second and a third diaphragms 100, 110, 120 which are movable in the axial direction against the needle 70.
The first diaphragm 100 and the second diaphragm 110 have the same effective area, and an effective area of the third diaphragm 120 is different from those of the first diaphragm 100 and the second diaphragm 110.

6 Claims, 9 Drawing Sheets

EJECTOR AND FUEL CELL SYSTEM USING THE SAME

CROSS REFERENCE TO RELATED APPLICATIONS

This application claims the foreign priority benefit under Title 35, United States Code, §119(a)-(d) of Japanese Patent Application No. 2009-034481, filed on Feb. 17, 2009, the contents of which are hereby incorporated by reference.

FIELD OF THE INVENTION

The present invention relates to an ejector and a fuel cell system using the ejector.

DESCRIPTION OF RELATED ART

Recently, a fuel cell, for example, a polymer electrolyte fuel cell (PEFC) is actively researched. The fuel cell generates electric power if hydrogen (fuel gas, reaction gas) is fed to the anode and air containing oxygen (oxidant gas, reaction gas) is fed to the cathode.

A fuel cell has a stack structure which stacks, for example, several tens to several hundreds of cells. Each cell is formed by sandwiching a membrane electrode assembly (MEA) between a pair of separators. The membrane electrode assembly includes two electrodes of anode (positive electrode) and cathode (negative electrode) and a polymer electrolyte membrane sandwiched between the two electrodes.

If hydrogen gas as a fuel is fed to the anode of the fuel cell and air containing oxygen as an oxidant is fed to the cathode, the fuel cell generates electric power by a chemical reaction. In a fuel cell system using the fuel cell described above, hydrogen is fed to the fuel cell from a hydrogen tank and an anode off-gas is discharged from the fuel cell. Here, since an excess amount of hydrogen is supplied from the hydrogen tank for generating electric power, the excess amount of hydrogen is contained in the anode off-gas discharged from the fuel cell. Therefore, the anode off-gas is circulated using a circulator and fed to the fuel cell by mixing the anode off-gas with hydrogen from the hydrogen tank.

As the circulator, conventionally, an ejector which utilizes pressure energy and requires no external power source has been commonly used.

In a fuel cell system using an ejector, for example, a regulator for regulating a pressure of hydrogen to be fed to a fuel cell depending on electric power generation and a device for switching an opening diameter of a nozzle disposed in the ejector for extracting a circulation ability corresponding to the electric power generation are required.

Conventionally, as the device for switching the opening diameter (opening area) of the nozzle of the regulator or the ejector, various kinds of technologies have been developed (for example, see JP2002-227799, JP2002-56868, JP2004-095528 and JP2005-337101).

SUMMARY OF THE INVENTION

Meanwhile, with respect to a conventional ejector, it has been expected to improve a control of an ejection pressure of a fluid ejected from a nozzle.

For example, it has been expected to effectively control a pressure difference between the electrodes of a fuel cell depending on an operating status of a fuel cell system using the ejector by improving a control of an ejection pressure of a fluid.

It is, therefore, an object of the present invention to provide an ejector and a fuel cell system using the ejector which can improve a control of an ejection pressure of a fluid.

For achieving the forgoing purposes, according to a first aspect of the present invention, there is provided an ejector, which includes a body, a nozzle to which a first fluid is supplied and having a trunk portion and a front end portion, a needle which is coaxially arranged with the nozzle and having a base portion and a tip portion, a diffuser which sucks a second fluid by a negative pressure generated by the first fluid ejected from the nozzle and discharges the second fluid and the first fluid by mixing the second fluid with the first fluid, a first diaphragm and a second diaphragm whose periphery portions are fixed to the body, while being fixed to the nozzle on one side and the other side apart from the one side, respectively, and enabling the nozzle to move in an axial direction against the needle, a third diaphragm whose periphery portion is fixed to the body on the one side which is further end side of the first diaphragm, while being fixed to the nozzle on the one side and enabling the nozzle to move in the axial direction against the needle, a first fluid chamber which is surrounded at least by the first diaphragm, the second diaphragm and the body and to be supplied with the first fluid, a second fluid chamber which is surrounded at least by the second diaphragm and the body and to be supplied with the second fluid, a third fluid chamber which is surrounded at least by the third diaphragm and the body and to be supplied with the third fluid, a fourth fluid chamber which is surrounded at least by the first diaphragm, the third diaphragm and the body and communicated with the atmosphere, a valve which is formed in the first fluid chamber by disposing a valving element on one of the nozzle and the needle and a valve seat on the other one of the nozzle and the needle, wherein the valving element seats on or leaves from the valve seat by a movement of the nozzle, and a back pressure chamber which is disposed between the trunk portion of the nozzle and the base portion of the needle and communicated with the first fluid chamber through the valve. The first diaphragm and the second diaphragm have the same effective area, and an effective area of the third diaphragm is different from the effective areas of the first diaphragm and the second diaphragm.

According to the ejector of the present invention, the first fluid is supplied in the nozzle from the first fluid chamber and the first fluid is ejected from the nozzle. Here, the nozzle is movable in the axial direction against the needle. Therefore, a flow rate of the first fluid to be ejected can be adjusted by relatively moving the nozzle and the needle. Three diaphragms of the first, the second and the third diaphragms are fixed to the nozzle, and the nozzle is movable by bending the first, the second and the third diaphragms using a pressure of the third fluid supplied to the third fluid chamber.

In addition, since a valve is formed in the first fluid chamber by disposing the valving element on one of the nozzle and the needle while disposing the valve seat on the other one of the nozzle and the needle, and the valving element seats on or leaves from the valve seat by a movement of the nozzle, a flow rate of the first fluid ejected from the nozzle can be controlled by utilizing the valve.

In addition, since the back pressure chamber which is communicated with the first fluid chamber through the valve is disposed between the trunk portion of the nozzle and the base portion of the needle, at least apart of a pressure of the first fluid to be given to the nozzle from the first fluid chamber through the valve can be compensated by the back pressure chamber.

In addition, since the effective area of the third diaphragm is different from those of the first and the second diaphragms having the same effective area, the ejection pressure is obtained as a function of the area ratio between the effective areas of the third diaphragm and the first and the second diaphragms. That is, for example, by setting the effective area of the third diaphragm larger than those of the first and the second diaphragms, it is possible to multiply (amplify) a pressure of the third fluid supplied to the third fluid chamber based on the area ratio and let the pressure act on the first and the second diaphragms.

In addition, contrary to this, by setting the effective area of the third diaphragm smaller than those of the first and the second diaphragms, it is possible to multiply (attenuate) a pressure of the third fluid supplied to the third fluid chamber based on the area ratio and let the pressure act on the first and the second diaphragms.

According to a second aspect of the present invention, there is provided a fuel cell system using the ejector according to the first aspect, where the ejector is provided in a fuel circulation path which feeds a discharged fuel discharged from a fuel cell to the fuel cell again by mixing the discharged fuel with a fuel from a fuel supply source.

According to the fuel cell system, when the anode off-gas discharged from a fuel cell stack is recirculated by mixing with hydrogen which is to be newly fed to the fuel cell stack by using the ejector, a control to amplify or attenuate a flow rate of the mixed fluid of the hydrogen and the anode off-gas to be fed to the fuel cell stack can be conducted by multiplying based on the area ratio. Therefore, a highly reliable flow rate control can be conducted with a simpler configuration in comparison with a flow rate control using, for example, an electric actuator. Accordingly, a control of a fuel cell system can be prevented from being complicated, thereby resulting in suppression of the cost.

Hence, ejection pressure of a fluid can be controlled so that the ejection pressure corresponds to the operation status of the fuel cell system by adjusting a pressure of the third fluid chamber. For example, it becomes possible to improve a fuel supply when an automobile mounting the fuel cell system is accelerated by temporarily increasing a pressure difference between the electrodes of the fuel cell. As a result, a fuel cell system which is excellent in controllability can be obtained.

According to a third aspect of the present invention, there is provided the fuel cell system according to the second aspect, where an oxidant gas to be fed to the fuel cell is supplied to the third fluid chamber through a branch path and a pressure regulation means for regulating a pressure of the oxidant gas is disposed in the branch path.

According to the fuel cell system, an ejection amount of the first fluid ejected from the nozzle can be preferably controlled by adjusting an amount of supply of the oxidant gas supplied to the third fluid chamber using a pressure adjusting means disposed in the branch path. In this case, it is possible to amplify a flow rate of the first fluid to be ejected against a supply amount of the third fluid based on the ratio of the effective area of the third diaphragm to the effective area of the first and the second diaphragms of the ejector as described above. In addition, contrary to this, it is also possible to attenuate a flow rate of the first fluid to be ejected against a supply amount of the third fluid based on the ratio.

Accordingly, a fuel cell system which is improved in control of ejection pressure of a fluid can be obtained.

According to the present invention, an ejector and a fuel cell system using the ejector which can improve control of ejection pressure of a fluid can be obtained.

DETAILED DESCRIPTION OF THE PREFERRED EMBODIMENT

Figure 1:
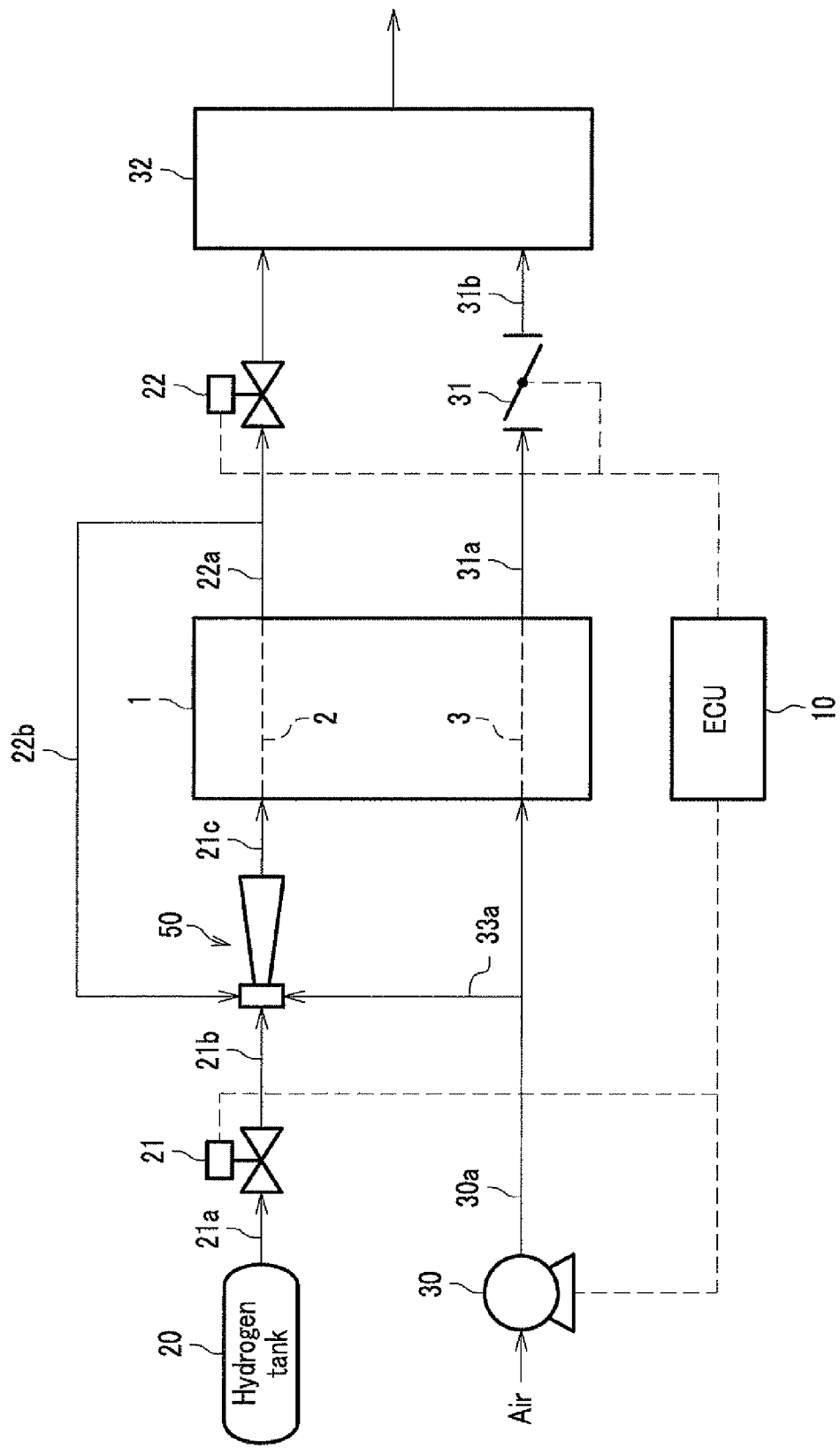
FIG. 1 is an illustration showing a configuration of a fuel cell system to which an ejector according to an embodiment of the present invention is applied.

Hereinafter, an ejector according to an embodiment of the present invention will be explained in detail by referring to drawings as appropriate.

Here, an ejector 50 according to the embodiment is installed in a fuel cell system mounted on a vehicle, for example, an electric vehicle, and the fuel cell system is configured including the ejector 50, a fuel cell stack 1, a hydrogen tank 20 as a fuel supply means (hydrogen supply source), a compressor 30 as a supply means of oxidant gas (air) and an ECU (Electronic Control Unit) 10 for controlling the foregoing components.

The fuel cell stack 1 is a polymer electrolyte fuel cell (PEFC) and formed by stacking a plurality of unit cells, each of which is formed by sandwiching a membrane electrode assembly (MEA) between separators (not shown). The MEA includes an electrolyte membrane (polymer membrane) and a cathode and an anode which sandwich the electrolyte membrane between them. In each separator, an anode flow path 2 and a cathode flow path 3 consisting of, for example, a groove and a through-hole are formed.

If the foregoing fuel cell stack 1 is fed hydrogen to the anode from the hydrogen tank 20 through the anode flow path 2 and air containing oxygen to the cathode from the compressor 30 through the cathode flow path 3, an electrode reaction occurs on a catalyst (for example, Pt) included in the anode and the cathode and the fuel cell stack 1 becomes ready to generate electric power.

Then, if the fuel cell stack 1 which is ready to generate electric power and an external load (for example, traction motor not shown) are electrically connected and an electric current flows, the fuel cell stack 1 generates electric power.

<Anode Line>

An anode line includes the hydrogen tank 20, a normally-closed cutoff valve 21 and the ejector 50 in upstream of the fuel cell stack 1 and a normally-closed purge valve 22 in downstream of the fuel cell stack 1.

The hydrogen tank 20 is connected to an inlet of the anode flow path 2 through a pipe 21a, the cutoff valve 21, a pipe 21b, the ejector 50 and a pipe 21c.

When an ignition of a fuel cell vehicle is turned on, and if activation of the fuel cell stack 1 is required and the cutoff valve 21 is opened by the ECU 10, hydrogen in the hydrogen tank 20 is supplied to the anode flow path 2 through, for example, the pipe 21a.

An outlet of the anode flow path 2 is connected to a suction port which is communicated with a second fluid chamber, which will be described later, of the ejector 50 through a pipe 22a and a pipe 22b. Then, an anode off-gas containing unreacted hydrogen discharged from the anode flow path 2 (anode) is returned to the ejector 50 located in upstream of the fuel cell stack 1 after a liquid water accompanying the anode off-gas is separated by a gas-liquid separator not shown.

The anode off-gas returned to the ejector 50 is supplied again to the anode flow path 2 after mixing with hydrogen from the hydrogen tank 20. That is, in the embodiment, a hydrogen circulation line which utilizes hydrogen by circulating the hydrogen through the pipe 22a and the pipe 22b is formed.

The purge valve 22 is a normally-closed electromagnetic valve which is opened by the ECU 10 when an impurity (for example, water vapor and nitrogen), which is contained in the anode off-gas (hydrogen) circulating in the pipe 22a and the pipe 22b when the fuel cell stack 1 is generating electric power, is discharged (purged).

If the purge valve 22 is opened, hydrogen gas in the pipe 22a flows into a dilutor 32 and is discharged outside the vehicle after the hydrogen gas is diluted in the dilutor 32 with air supplied through, for example, a pipe 31a of a cathode line described later.

A cathode line includes the compressor 30 and the dilutor 32 (gas treatment device).

The compressor 30 is connected to an inlet of the cathode flow path 3 through a pipe 30a. If the compressor 30 is activated with a predetermined rotation speed according to an instruction transmitted from the ECU 10, the compressor 30 takes in air containing oxygen and supplies the air to the cathode flow path 3. A rotation speed of the compressor 30 is generally increased when an accelerator pedal depression (accelerator gate opening) is increased so as to supply a large amount of air at high pressure.

Meanwhile, the compressor 30 is operated by the fuel cell stack 1 and/or a high voltage battery (not shown) for charging and discharging the generated electric power of the fuel cell stack 1 as the electric power source.

The pipe 30a is branched at the middle. The branched portion forms an air branch path 33a as a branch path and is connected to an inlet which is communicated with a third fluid chamber 43 of the ejector 50, which will be described later. That is, air from the compressor 30 is directly supplied to the third fluid chamber 43 (as a pilot pressure) of the ejector 50 through the air branch path 33a.

An outlet of the cathode flow path 3 is connected to the dilutor 32 through the pipe 31a, a back pressure valve 31 and the pipe 31b. A humid cathode off-gas discharged from the cathode flow path 3 (cathode) is supplied to the dilutor 32 through, for example, the pipe 31a. The back pressure valve 31 controls a pressure of air in the cathode flow path 3 and consists of, for example, a butterfly valve.

The dilutor 32 mixes the anode off-gas introduced from the purge valve 22 with the cathode off-gas (diluting gas) introduced from the pipe 31b to dilute hydrogen in the anode off-gas with the cathode off-gas.

[Ejector]

Figure 2:
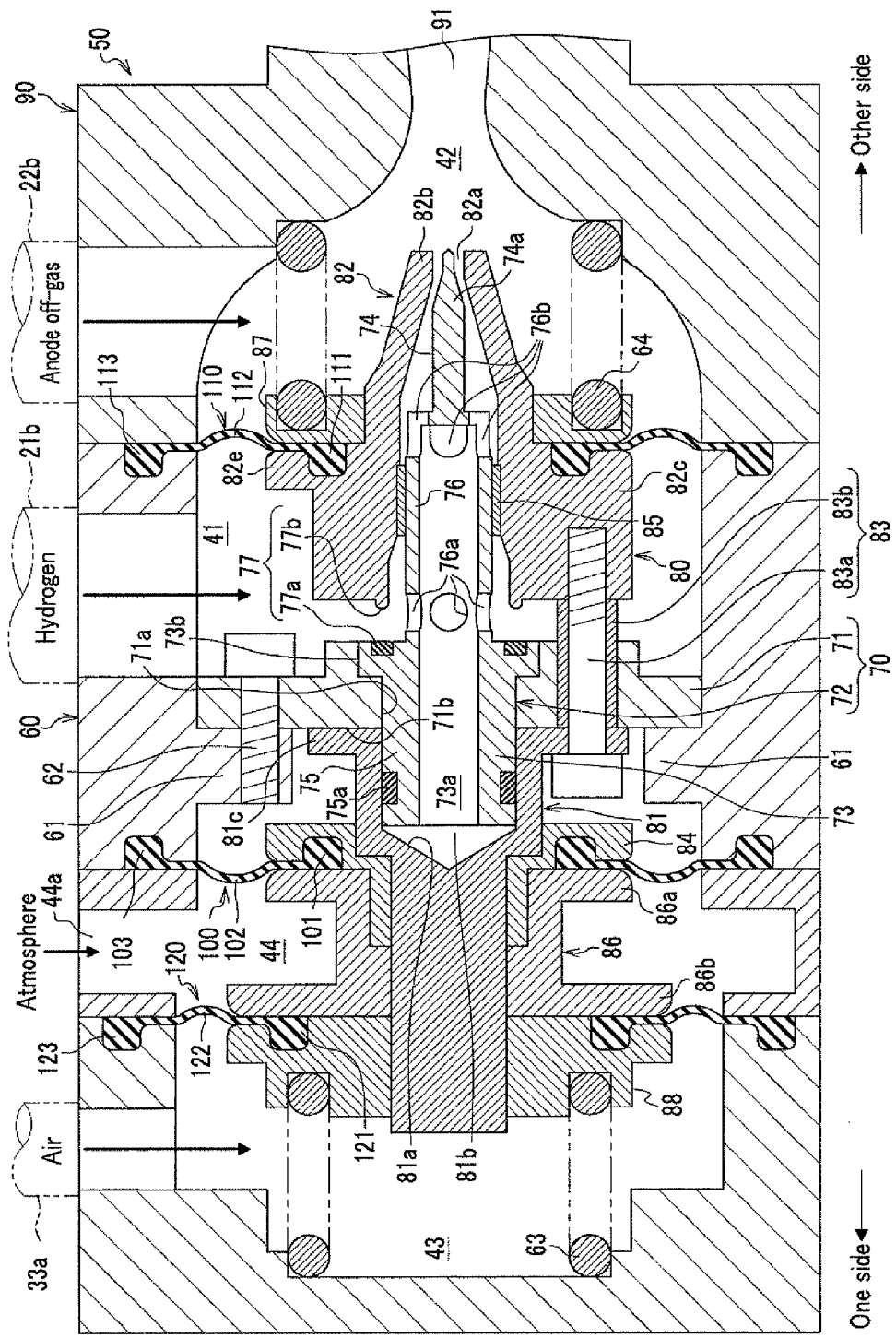
FIG. 2 is a cross sectional view showing a structure of an ejector.

Next, the ejector 50 will be explained by referring to FIG. 2. It is noted that in the explanation below, as shown in FIG. 2, a side that a base portion 73 of a needle body 72 constituting a needle 70 is disposed is named as "one side" and a side that a tip portion 74 of the needle body 72 is disposed is named as "other side".

The ejector 50 includes a body 60, the needle 70 which is fixed inside the body 60, a nozzle 80 which houses the needle 70 and has substantially a tubular shape, and a diffuser 90 which is disposed on a side of an ejection port 82a of the nozzle 80. The needle 70 and the nozzle 80 are contained in the body 60, and the needle 70, the nozzle 80 and the diffuser 90 are coaxially arranged.

In the ejector 50 according to the embodiment, the needle 70 is fixed to the body 60, and the nozzle 80 is configured to be movable in the axial direction against the needle 70, as will be described later.

In addition, a first and a second diaphragms 100, 110 made of elastic member (for example, synthetic rubber material) which bend following a movement of the nozzle 80 are fixed between the body 60 and the nozzle 80 at a base end portion 81 (one side) and a front end portion 82 (other side), which is distant from the base end portion 81, of the nozzle 80, respectively. Furthermore, a third diaphragm 120 made of elastic member (for example, synthetic rubber material) which also bends following a movement of the nozzle 80 is fixed between the body 60 and the nozzle 80 at a further end side of the first diaphragm 100 on the one side. That is, the nozzle 80 is movable in the axial direction by the three diaphragms of the third, the first and the second diaphragms 120, 100, 110 which are disposed at an interval from the one side toward the other side, and an inside of the body 60 is partitioned into four fluid chambers (third fluid chamber 43, fourth fluid chamber 44, first fluid chamber 41 and second fluid chamber 42) from the one side toward the other side by the three diaphragms of the third, the first and the second diaphragms 120, 100, 110. A detailed explanation for each portion will be described later in detail.

The needle 70 includes an annular support portion 71 and the needle body 72 which is supported by the support portion 71 and extends to the other side along an extending direction of the body 60. The support portion 71 is fixed to a protruding portion 61 disposed on an inner wall surface of the body 60 with a plurality of bolts 62 (only one bolt is shown in FIG. 2), and the base portion 73, which will be described later, of the needle body 72 is inserted in and fixed to an insertion hole 71a which is formed in a center portion of the support portion 71.

It is noted that in the support portion 71, a plurality of through-holes not shown are formed in the axial direction, and hydrogen as a first fluid described later can flow through the through-holes.

Hereinafter, each part of the ejector 50 will be described in detail.

The body 60 has approximately a tubular shape and contains the needle 70 and the nozzle 80. The diffuser 90 is disposed on the other side of the body 60, and a delivery port 91 of the diffuser 90 is connected to the anode flow path 2 of the fuel cell stack 1 through the pipe 21c shown in FIG. 1.

In addition, as shown in FIG. 2, a first spring 63 and a second spring 64 for maintaining a relative position between the nozzle 80 and the needle 70 by pressing the nozzle 80 are held inside the body 60. In the embodiment, pressing forces of the first and the second springs 63, 64 are set considering a pressure of hydrogen as the first fluid supplied to the first fluid chamber 41 described later so that the initial position of the nozzle 80 is set to a full opening condition of the nozzle 80, that is, the condition where the nozzle 80 is entirely pressed to the other side as shown in FIG. 2.

The needle body 72 includes the tubular base portion 73 and the tip portion 74 which is disposed on the other side of the base portion 73 and inserted into the ejection port 82a of the nozzle 80. The base portion 73 includes a large diameter portion 75 and a small diameter portion 76, and a passage 73a for passing hydrogen as the first fluid described later is formed by utilizing a hollow which is formed inside the large diameter portion 75 and the small diameter portion 76. A flange portion 73b is formed on the other side of the large diameter portion 75, and a valve seat 77a consisting of an annular seal member (elastic member) constituting a valve 77, which will be described later, is disposed in the flange portion 73b.

In addition, the base end portion 81 as a trunk portion of the nozzle 80 described later is fit on the large diameter portion 75 on the one side via a seal member 75a.

Four openings 76a (only three openings are shown in FIG. 2) which are inlets of the passage 73a are formed in the small diameter portion 76 on the one side. In addition, in the small diameter portion 76 on the other side, four slot-like openings 76b (only three openings are shown in FIG. 2) which are outlets of the passage 73a are formed. That is, one side of the passage 73a is communicated with the first fluid chamber 41 described later through the opening 76a and the other side of the passage 73a is communicated with inside of the nozzle 80 through the slot-like opening 76b on the side of the tip portion 74.

As shown in FIG. 2, an inner surface of a bearing 85 which is locked on an inner circumferential surface of the front end portion 82, which will be described later, of the nozzle 80 is in contact with an outer circumferential surface of the small diameter portion 76, and the front end portion 82 is movable in the axial direction against the small diameter portion 76 (needle body 72).

The tip portion 74 is inserted into the ejection port 82a of the nozzle 80, and a tip 74a is tapered off to a point.

The nozzle 80 includes the base end portion 81 disposed on the base end side (the one side) of the needle 70, the front end portion 82 disposed on the front end side (the other side) of the needle 70 and a connection member 83 connecting the base end portion 81 and the front end portion 82.

The base end portion 81 is formed in a cylindrical shape with a bottom having substantially a hat shape in cross section, and the base portion 73 of the needle body 72 on the one side is housed slidably in the axial direction in a hollow portion of the base end portion 81. In the embodiment, a bottom portion 81a of the hollow portion is formed in a concave triangle shape in cross section, and a back pressure chamber 81b is formed between the bottom portion 81a and one end surface of the base portion 73 of the needle body 72, facing the bottom portion 81a. The back pressure chamber 81b is communicated with the passage 73a of the needle body 72 on the one side. That is, the back pressure chamber 81b is communicated with the first fluid chamber 41 through the passage 73a, the opening 76a and the valve 77 described later. Therefore, the first fluid in the first fluid chamber 41 flows into the back pressure chamber 81b through the passage 73a, the opening 76a and the valve 77, and a force acting in the movable direction (direction moving to the other side) of the nozzle 80 is cancelled, accordingly.

A flange portion 81c is formed in the base end portion 81 on the other side. The flange portion 81c is configured to be in contact with one end surface 71b of the support portion 71 of the needle 70, and a movement of the nozzle 80 toward the other side is limited when the flange portion 81c is in contact with the one end surface 71b. In the embodiment, when the flange portion 81c is in contact with the one end surface 71b, a gate opening of the ejection port 82a of the front end portion 82 has a maximum value. That is, the opening (annular clearance to be formed between the tip portion 74 of the needle 70 and the front end portion 82) at the ejection port 82a has a maximum opening area.

In addition, a through-hole is formed in the flange portion 81c and a bolt 83a constituting the connection member 83 is inserted into the through-hole.

In addition, the first diaphragm 100 and the third diaphragm 120 are fixed to the base end portion 81. The first diaphragm 100 is an annular member which is fixed to the base end portion 81 so as to surround the base end portion 81. The first diaphragm 100 consists of an inner periphery portion 101 to be fit in the base end portion 81, a thin skirt portion 102 extending to outside of the radial direction from the inner periphery portion 101, and an outer periphery portion 103 which is formed in an outer circumferential portion (surrounding) of the skirt portion 102 and fixed to the body 60.

The inner periphery portion 101 is sandwiched between an annular holding member 84 to be fit on the base end portion 81 and an annular portion 86a on the other side of an annular presser member 86 which covers the holding member 84, and as a result, the inner periphery portion 101 is fixed to the base end portion 81. The skirt portion 102 is free to bend or curve by following a movement of the nozzle 80. Furthermore, the outer periphery portion 103 is sandwiched between blocks constituting the body 60 and fixed thereto.

Air tightness between the first fluid chamber 41 and the fourth fluid chamber 44, which are partitioned by the first diaphragm 100, is preferably maintained by disposing the first diaphragm 100 described above.

In addition, the third diaphragm 120 is fixed to the base end portion 81 on a further end side of the first diaphragm 100 on the one side. The third diaphragm 120 is an annular member fixed to the base end portion 81 so as to surround one end portion of the base end portion 81, and consists of an inner periphery portion 121 to be fit in the base end portion 81, a thin skirt portion 122 extending to outside of the radial direction from the inner periphery portion 121, and an outer periphery portion 123 which is formed in an outer circumferential portion (surrounding) of the skirt portion 122 and fixed to the body 60.

The inner periphery portion 121 is sandwiched between an annular portion 86b on the one side of the presser member 86 fit on the base end portion 81 and an annular holding portion 88 which further covers the annular portion 86b on the one side, and as a result, the inner periphery portion 121 is fixed to one end portion of the base end portion 81. The skirt portion 122 is free to bend or curve by following a movement of the nozzle 80, and the outer periphery portion 123 is sandwiched between blocks constituting the body 60 and fixed thereto.

The third diaphragm 120 according to the embodiment is larger in diameter than the first diaphragm 100 and the second diaphragm 110 described later, and an effective area of the third diaphragm 120 is set to be larger than those of the first and the second diaphragms 100, 110.

Air tightness between the third fluid chamber 43 and the fourth fluid chamber 44 which are partitioned by the third diaphragm 120 is preferably maintained by disposing the third diaphragm 120 described above.

It is noted that the first spring 63 is disposed in a contracted state between the holding member 88 and a side wall of the third fluid chamber 43.

Next, the front end portion 82 has a tubular ejection portion 82b extending along an extending direction of the body 60, and the ejection port 82a is formed at the front end of the ejection portion 82b. The ejection portion 82b is tapered off to gradually and continuously decrease the diameter toward the ejection port 82a.

The front end portion 82 is arranged so as to almost entirely cover the small diameter portion 76 and the tip portion 74 of the base portion 73 of the needle 70, and formed slidably in the axial direction against the needle 70. An annular protruding valving element 77b constituting the valve 77 is formed on one end face of the base end portion 82c of the front end portion 82.

The valving element 77b is disposed facing an annular valve seat 77a disposed in the large diameter portion 75 of the base portion 73 of the needle 70, and seatable on the valve seat 77a when the nozzle 80 moves to the one side (see FIG. 6) as will be described later.

In the embodiment, an effective diameter (pressure receiving area) of the back pressure chamber 81b is set equal to an effective diameter (sealing area) of the valving element 77b of the valve 77.

In addition, a bolt 83a constituting the connection member 83 is screwed together with the base end portion 82c of the front end portion 82 via a collar 83b. The collar 83b has a role as a spacer which maintains a distance between the base end portion 81 and the front end portion 82 at a predetermined distance as a unit.

In addition, the second diaphragm 110 is fixed to the front end portion 82. The second diaphragm 110 is an annular member fixed to the front end portion 82 so as to surround the front end portion 82, and consists of an inner periphery portion 111 fixed to the front end portion 82, a thin skirt portion 112 extending outside of the radial direction from the inner periphery portion 111, and an outer periphery portion 113 which is formed in the outer circumferential portion of the skirt portion 112 and fixed to the body 60.

The inner periphery portion 111 is sandwiched between a flange portion 82e disposed in the front end portion 82 and an annular presser member 87 which covers the flange portion 82e, and as a result, the inner periphery portion 111 is fixed to the front end portion 82. The skirt portion 112 is free to bend or curve by following a movement of the nozzle 80. The outer periphery portion 113 is sandwiched between the body 60 and the diffuser 90 to be fixed.

Air tightness of the second fluid chamber 42 which is partitioned by the second diaphragm 110 is preferably maintained by disposing the second diaphragm 110 described above. In addition, air tightness of the first fluid chamber 41 which is partitioned by the foregoing first diaphragm 100 and the second diaphragm 110 is preferably maintained.

It is noted that the foregoing second spring 64 is disposed in a contracted state between the presser member 87 and a wall of the second fluid chamber 42 facing the presser member 87.

In addition, the first diaphragm 100 is identical to the second diaphragm 110, and an effective area of the first diaphragm 100 is set equal to that of the second diaphragm 110.

As described above, the first fluid chamber 41 is formed at least by the first and the second diaphragms 100, 110 and the body 60 surrounding first fluid chamber 41, and hydrogen is supplied to the first fluid chamber 41 through the pipe 21b. In addition, an anode off-gas containing unreacted hydrogen discharged from the anode flow path (anode) 2 through the pipe 22b is supplied to the second fluid chamber 42 which is formed at least by the second diaphragm 110 and the body 60 surrounding the second fluid chamber 42. Furthermore, air is supplied to the third fluid chamber 43, which is formed at least by the third diaphragm 120 and the body 60 surrounding the third fluid chamber 43, from the compressor 30 through the air branch path 33a.

The fourth fluid chamber 44, which is formed at least by the first and the third diaphragms 100, 120 and the body 60 surrounding the fourth fluid chamber 44, is communicated with the atmosphere through an opening 44a. That is, the first fluid chamber 41 is neighboring the third fluid chamber 43 via the fourth fluid chamber 44 which is communicated with the atmosphere.

The ejector 50 described above ejects hydrogen supplied to the first fluid chamber 41 from the ejection port 82a of the nozzle 80 through the flow path 73a which is formed inside the needle body 72.

Then, by utilizing a negative pressure generated by hydrogen ejected from the ejection port 82a of the nozzle 80, the ejector 50 sucks anode off-gas supplied to the second fluid chamber 42 through the pipe 22b, and after mixing the anode off-gas with the hydrogen in the diffuser 90, these gases are flowed out. The flowed-out mixed fluid is supplied to the anode flow path 2 of the fuel cell stack 1 through the pipe 21c.

On the other hand, in the ejector 50, air (signal pressure) from the compressor 30 is supplied to the third fluid chamber 43 as described above, and based on a pressure of the air supplied to the third fluid chamber 43, the nozzle 80 moves to the other side and an ejection amount of hydrogen to be ejected from the ejection port 82a of the nozzle 80 is adjusted.

Figure 3:
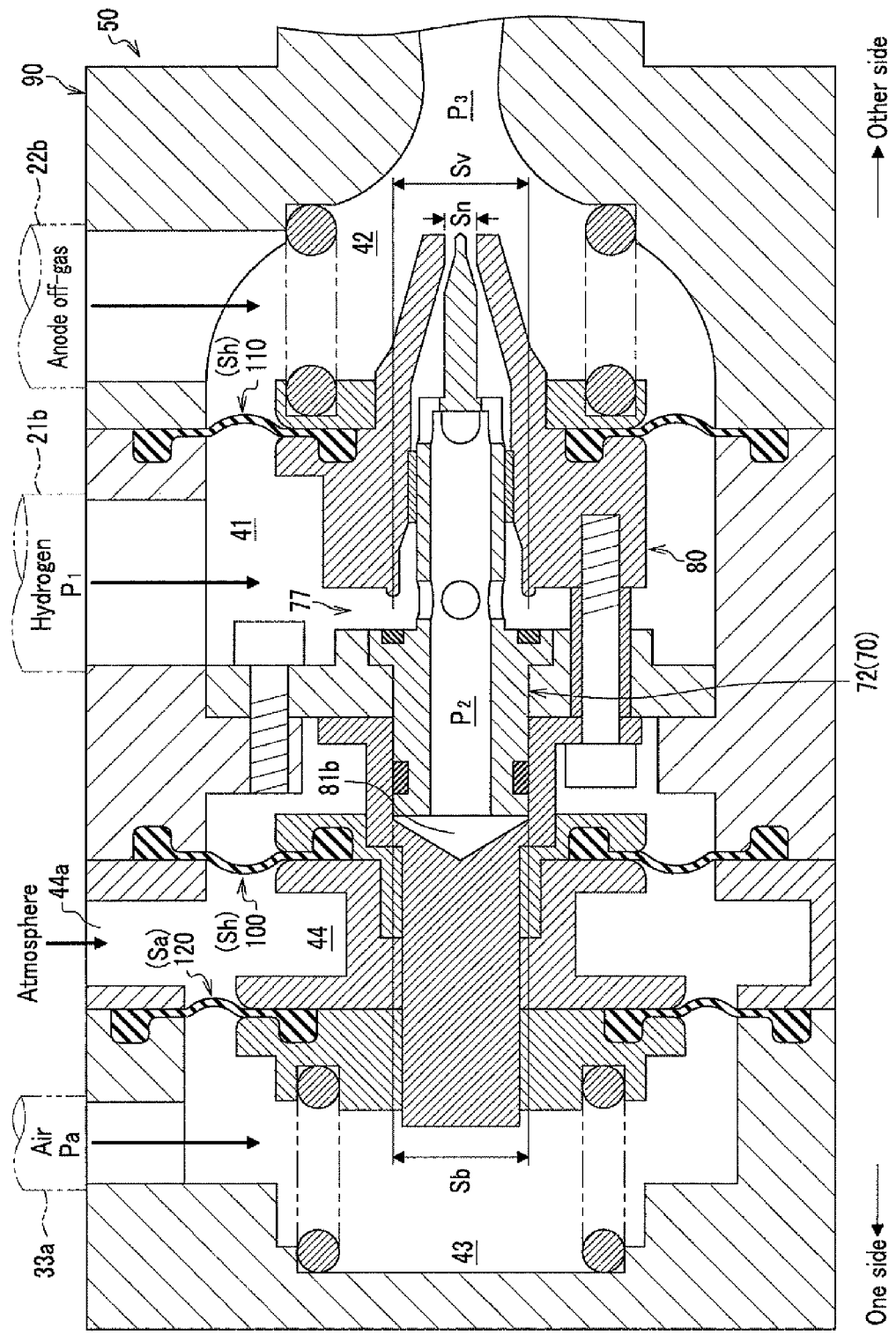
FIG. 3 is a view for explaining a relationship between pressures acting on an ejector.

Next, relations between pressures acting on the ejector 50 will be explained by referring to FIG. 3. Hereinafter, the explanation will be made by assuming that a force acting in a movable direction (direction toward the one side) of the nozzle 80 is plus and a force acting in the reverse direction thereof is minus.

First, a force F1 acting on the first fluid chamber 41 in upstream of the valve 77 is expressed by the following formula (1), assuming that a pressure of hydrogen supplied to the first fluid chamber 41 is $P_1$, effective areas of the first and the second diaphragms 100, 110 are Sh, a sealing area of the valving element 77b of the valve 77 is Sv, and an effective diameter (pressure receiving area) of the back pressure chamber 81b is Sb.

$$F1 = P_1(Sh - Sv - (Sh - Sb)) \tag{1}$$

In addition, a force F2 acting on the nozzle 80 in downstream of the valve 77 is expressed by the following formula (2), assuming that a pressure acting on the nozzle 80 in downstream of the valve 77 is $P_2$ and an opening area at the ejection port 82a of the nozzle 80 is Sn.

$$F2 = P_2(Sv - Sn - Sb) \tag{2}$$

A force F3 acting on the second fluid chamber 42 is expressed by the following formula (3), assuming that a pressure (ejection pressure) acting on the second fluid chamber 42 is $P_3$ and the atmospheric pressure acting on the fourth fluid chamber 44 is Pg.

$$F3 = P_3(Sh - Sn) - Pg \cdot Sh \tag{3}$$

In addition, a force F4 acting on the third fluid chamber 43 is expressed by the following formula (4), assuming that a pressure of air supplied to the third fluid chamber 43 is Pa and an effective area of the third diaphragm 120 is Sa.

$$F4 = (Pa - Pg)Sa \tag{4}$$

From these formulae (1) to (4), a relation of forces acting on the ejector is expressed by the following formulae (5),(6).

$$F1 + F2 - F3 + F4 = 0 \tag{5}$$

That is, $$P_1(Sh - Sv - Sh + Sb)) + P_2(Sv - Sn - Sb) - (P_3(Sh - Sn) - Pg \cdot Sh) + (Pa - Pg)Sa = 0 \tag{6}$$

Here, for simplicity, assume that $P_2 = P_3$, assuming that a pressure difference is not generated between inside of the nozzle 80 and the second fluid chamber 42 in the vicinity of the ejection port 82a of the nozzle 80. In addition, the back pressure chamber 81b is disposed in the ejector 50, and in the embodiment, since the pressure receiving area Sb of the back pressure chamber 81b is equal to the sealing area Sv of the valving element 77b of the valve 77 as described above, there is a relation Sb=Sv.

Therefore, based on these relations, the formula (6) is expressed by the following formula (7).

$$(P_3 - Pg)Sh = (Pa - Pg)Sa \qquad (7)$$

Here, ($P_3$–Pg) and (Pa–Pg) in the formula (7) indicate gauge pressures, respectively. Using the formula (7), the ejection pressure $P_3$ (gauge pressure) acting on the second fluid chamber 42 is expressed by the following formula (8).

$$P_3(\text{gauge pressure}) = Pa(\text{gauge pressure}) \times Sa/Sh \qquad (8)$$

That is, the ejection pressure $P_3$ can be obtained as a function of a product of the air pressure Pa supplied to the third fluid chamber 43 and the area ratio Sa/Sh. Therefore, the ejection pressure $P_3$ can be obtained at an arbitrarily multiplied pressure based on the area ratio Sa/Sh.

Then, for example, as shown in the embodiment, by setting the effective area of the third diaphragm 120 larger than those of the first and the second diaphragms 100, 110, the ejection pressure $P_3$ can be amplified (increased) at an arbitrarily multiplied pressure based on the area ratio Sa/Sh.

Figure 4A:
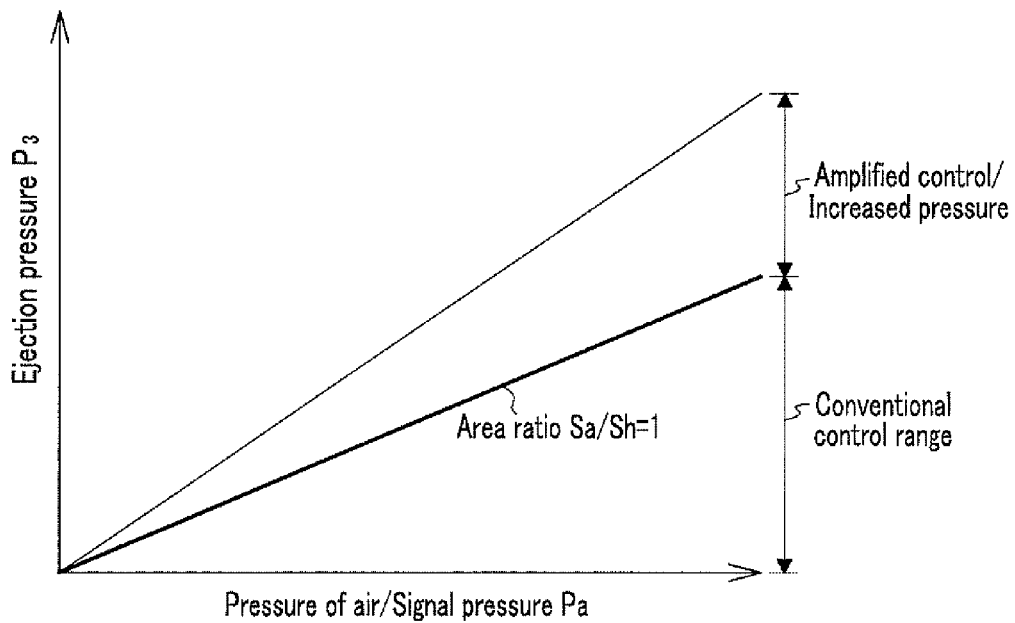
FIG. 4A and FIG. 4B are graphs showing relationships between a pressure of air and an ejection pressure.

FIG. 4A is a graph showing a relationship between a pressure Pa (signal pressure) of air supplied to the third fluid chamber 43 and the ejection pressure $P_3$.

As shown in FIG. 4A, a control to amplify (increase) the ejection pressure $P_3$ becomes possible by setting the area ratio Sa/Sh larger than 1, in contrast to a control where the signal pressure is equal to the ejection pressure (area ratio Sa/Sh=1). That is, it is possible to control so that a pressure on the side of hydrogen is more amplified (increased) than a pressure on the side of air. For example, when the signal pressure is 100 KPa and if the area ratio Sa/Sh is set to 2.0, the ejection pressure may be increased to 200 KPa. In addition, in this case, the ejection pressure may be set appropriately in a range of, for example, from 0 to 200 KPa (the range of conventional technology is limited to 0 to 100 KPa) by adjusting the signal pressure supplied to the third fluid chamber 43 through control of a rotation speed of the compressor 30 by the ECU 10.

Figure 4B:
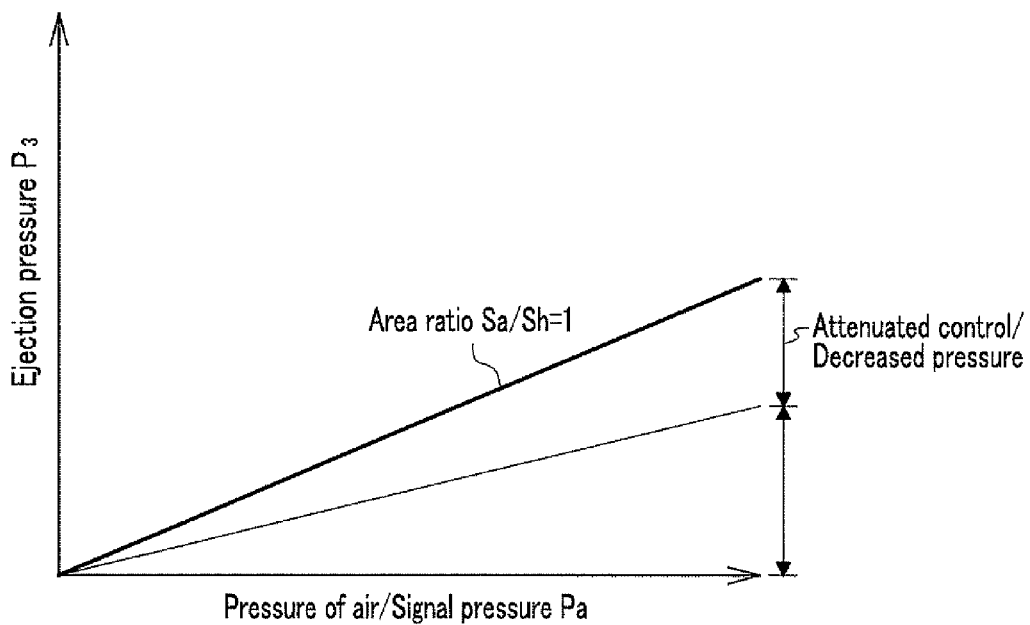

In addition, contrary to this case, if the area ratio Sa/Sh is set smaller than 1, as shown in FIG. 4B, a control to attenuate (decrease) the ejection pressure $P_3$ becomes possible, in contrast to a control where the signal pressure is equal to the ejection pressure (area ratio Sa/Sh=1). That is, it is possible to control so that a pressure on the side of hydrogen is more attenuated (decreased) than a pressure on the side of air. For example, when the signal pressure is 100 KPa and if the area ratio Sa/Sh is set to 0.5, the ejection pressure may be decreased to 50 KPa. In addition, in this case, the ejection pressure may be set appropriately in a range of, for example, from 0 to 50 KPa by adjusting the signal pressure supplied to the third fluid chamber 43 through control of a rotation speed of the compressor 30 by the ECU 10.

Next, operations of the ejector 50 in a fuel cell system will be explained.

Regarding a fuel cell system having the ejector 50 described above, as shown in FIG. 2, in the initial state that the fuel cell system is not activated, the ejector 50 is under the condition that the nozzle 80 is moved to the other side by the pressing forces from the first and the second springs 63, 64.

Figure 5:
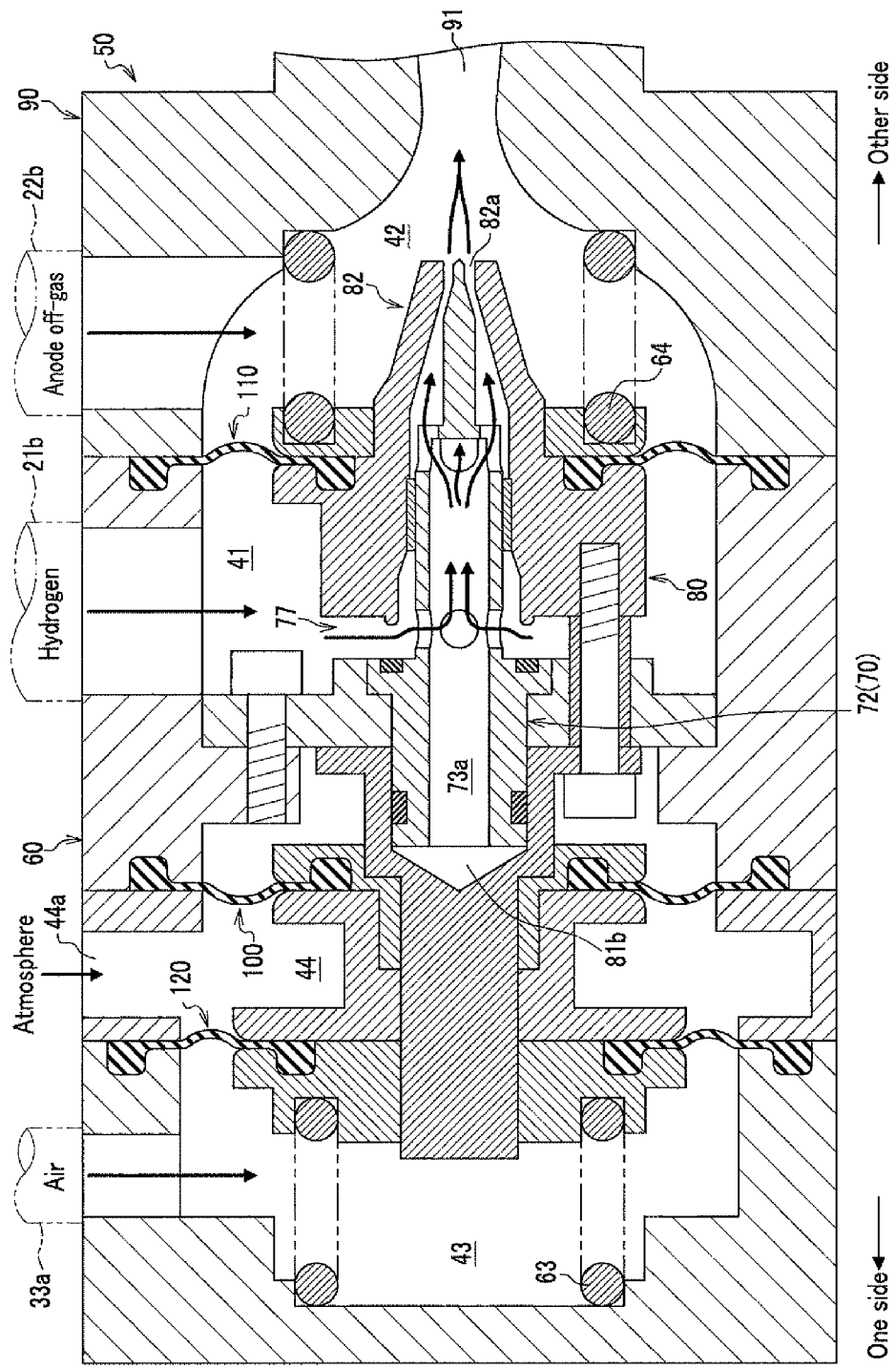
FIG. 5 is a view for explaining flows of fluids.

After that, when the ignition not shown is turned on to activate the fuel cell stack 1 and if the cutoff valve 21 is opened by the ECU 10, hydrogen in the hydrogen tank 20 is supplied to the first fluid chamber 41 of the ejector 50 through, for example, the pipe 21a (see FIG. 5). The hydrogen supplied to the first fluid chamber 41 flows into the second fluid chamber 42 from the ejection port 82a of the nozzle 80 through the passage 73a of the needle 70.

Here, if hydrogen is supplied so that a predetermined pressure of the supplied hydrogen, that is, a pressure corresponding to a pressure difference between the first and the second springs 63, 64 acts on the second fluid chamber 42, a pressing force of the first spring 63 becomes equal to that of the second spring 64 and the nozzle 80 starts to move to the one side.

Figure 6:
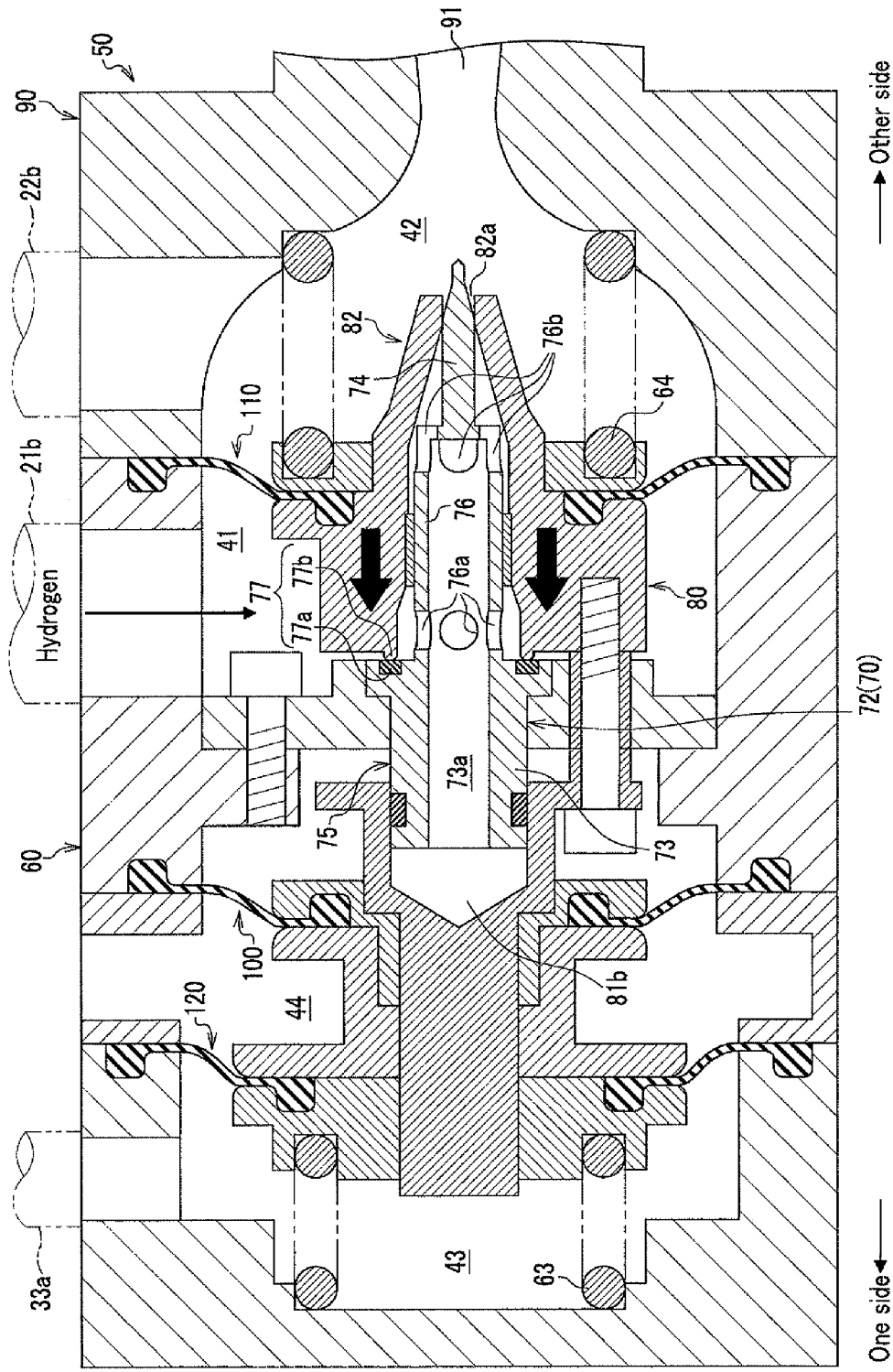
FIG. 6 is a cross sectional view showing a status of an ejector when a nozzle is moved to a side to close a valve.

Then, if the pressure of hydrogen is increased to a predetermined pressure, the nozzle 80 is further moved to the one side and the valve 77 is once closed when the valving element 77b seats on the valve seat 77a (see FIG. 6).

After that, the compressor 30 is operated at a predetermined rotation speed by a control of the ECU 10. When air is supplied to the third fluid chamber 43 through the air branch path 33a, a pressure of air in the third fluid chamber 43 increases and a force which moves the nozzle 80 to the other side starts to act on. At the same time, hydrogen is consumed in the anode flow path 2 of the fuel cell stack 1, and a pressure of hydrogen in the second fluid chamber 42 which is communicated with the anode flow path 2 through the pipe 21c starts to decrease. Therefore, a pressure difference is produced between the upstream and the downstream of the valve 77, and when the valve 77 starts to open by the movement of the nozzle 80 to the other side due to the air supply described above, hydrogen flows into the passage 73a of the needle 70 from the first fluid chamber 41 through the valve 77, and subsequently, is ejected into the second fluid chamber 42 from the ejection port 82a of the nozzle 80 (see FIG. 5).

If a pressure of air in the third fluid chamber 43 is further increased, the nozzle 80 is further moved to the other side and the valve 77 is further opened, and as a result, an amount of hydrogen corresponding to the pressure of air supplied to the third fluid chamber 43 is ejected from the ejection port 82a (see FIG. 5).

Here, from the formula (8), the ejection pressure $P_3$ acting on the second fluid chamber 42 can be obtained as a function of a product of the air pressure Pa supplied to the third fluid chamber 43 and the area ratio Sa/Sh. Therefore, a control to amplify (increase) the ejection pressure $P_3$ becomes possible. That is, it becomes possible to control so that a pressure on the side of hydrogen is amplified (increased) in comparison with a pressure on the side of air.

Meanwhile, as described above, an anode off-gas is flowed back in the second fluid chamber 42 through the pipe 22b. The anode off-gas to be supplied to the second fluid chamber 42 is sucked by a negative pressure generated by hydrogen which is ejected from the ejection port 82a of the nozzle 80, and supplied to the anode flow path 2 of the fuel cell stack 1 after the anode off-gas is mixed with the hydrogen in the diffuser 90.

According to the ejector 50 of the embodiment described above, the effective area Sa of the third diaphragm 120 is different from the effective area Sh of the first and the second diaphragms 100, 110 which are set to be identical each other. Therefore, the ejection pressure $P_2$ is obtained as a function of the area ratio Sa/Sh. That is, for example, by setting the effective area Sa of the third diaphragm 120 larger than the effective area Sh of the first and the second diaphragms 100, 110, the pressure Pa of the third fluid supplied to the third fluid chamber 43 may be applied to the first and the second diaphragms 100, 110 by multiplying (amplifying) the pressure Pa using the area ratio Sa/Sh.

In addition, contrary to the above, by setting the effective area Sa of the third diaphragm 120 smaller than the effective area Sh of the first and the second diaphragms 100, 110, the pressure Pa of the third fluid supplied to the third fluid chamber 43 may be acted on the first and the second diaphragms 100, 110 by multiplying (attenuating) the pressure Pa using the area ratio Sa/Sh. Accordingly, a control of ejection pressure of the first fluid can be improved.

In addition, according to a fuel cell system using the ejector 50 of the embodiment, when the anode off-gas discharged from the fuel cell stack 1 is mixed with hydrogen which is to be newly fed to the fuel cell stack 1 and recirculated using the ejector 50, a control to amplify or attenuate a flow rate of the mixed fluid of the anode off-gas and the hydrogen to be fed to the fuel cell stack 1 based on the area ratio Sa/Sh becomes possible. As a result, a highly reliable flow rate control can be conducted with a simpler configuration in comparison with a flow rate control using, for example, an electric actuator. Accordingly, a control of a fuel cell system can be prevented from being complicated, resulting in suppression of the cost.

In addition, since a flow rate of the mixed fluid of the anode off-gas and hydrogen to be fed to the fuel cell stack 1 can be amplified based on the area ratio Sa/Sh, it is possible to conduct a preferable control when a temporary pressure increase on the anode side is required, that is, for example, when a rapid acceleration is required in a automobile mounting a fuel cell system, or when a discharge of water accumulated on the anode side is required.

In addition, since a control to amplify or attenuate based on the area ratio Sa/Sh is possible, a pressure on the anode side may be set higher than a pressure on the cathode side, or contrary to this, the pressure on the anode side may be set lower than the pressure on the cathode side, in accordance with characteristics of a membrane electrode assembly (MEA) which constitutes the fuel cell stack 1.

In addition, since air to be fed to the fuel cell stack 1 is supplied to the third fluid chamber 43 through the air branch path 33a, an amount of air supplied to the third fluid chamber 43 can be adjusted by controlling a rotation speed of the compressor 30 by the ECU 10, and an ejection amount of hydrogen ejected from the nozzle 80 can be preferably adjusted.

In this case, it is possible to set so that a flow rate of hydrogen to be ejected is amplified against an amount of air supply, or contrary to this, the flow rate of hydrogen to be ejected is attenuated against the amount of air supply, based on the area ratio Sa/Sh, which is a ratio of the effective area Sa of the third diaphragm 120 to the effective area Sh of the first and the second diaphragms 100, 110 in the ejector 50 as described above.

Accordingly, a fuel cell system which is improved in the ejection pressure control of hydrogen to be ejected from the nozzle 80 can be obtained.

The embodiment of the present invention has been explained. However, the present invention is not limited to the embodiment and can be embodied in various forms, for example, as follows without departing from the sprit and scope of the present invention.

For example, the valving element 77b constituting the nozzle 80 may be disposed in the large diameter portion 75 in the base portion 73 of the needle 70 and the valve seat 77a may be disposed in the base end portion 82c of the front end portion 82 of the nozzle 80.

It is noted that a shape of the valving element 77b is not limited to an annular shape, but may be formed in various shapes, for example, an ellipsoidal annular shape, a long annular shape, and many-sided annular shape.

Figure 7:
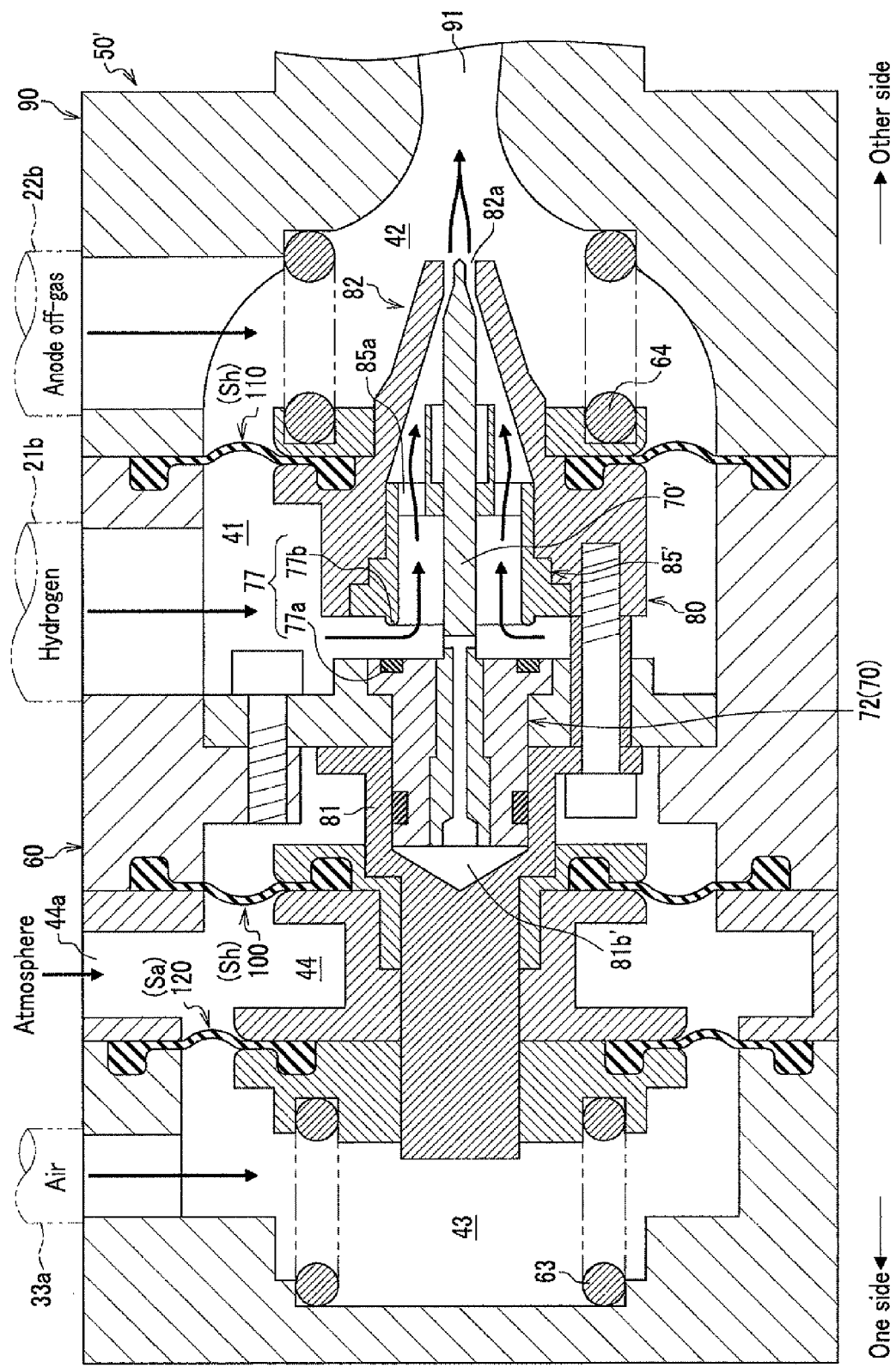
FIG. 7 is a cross sectional view showing an ejector according to a modified example.
Figure 8:
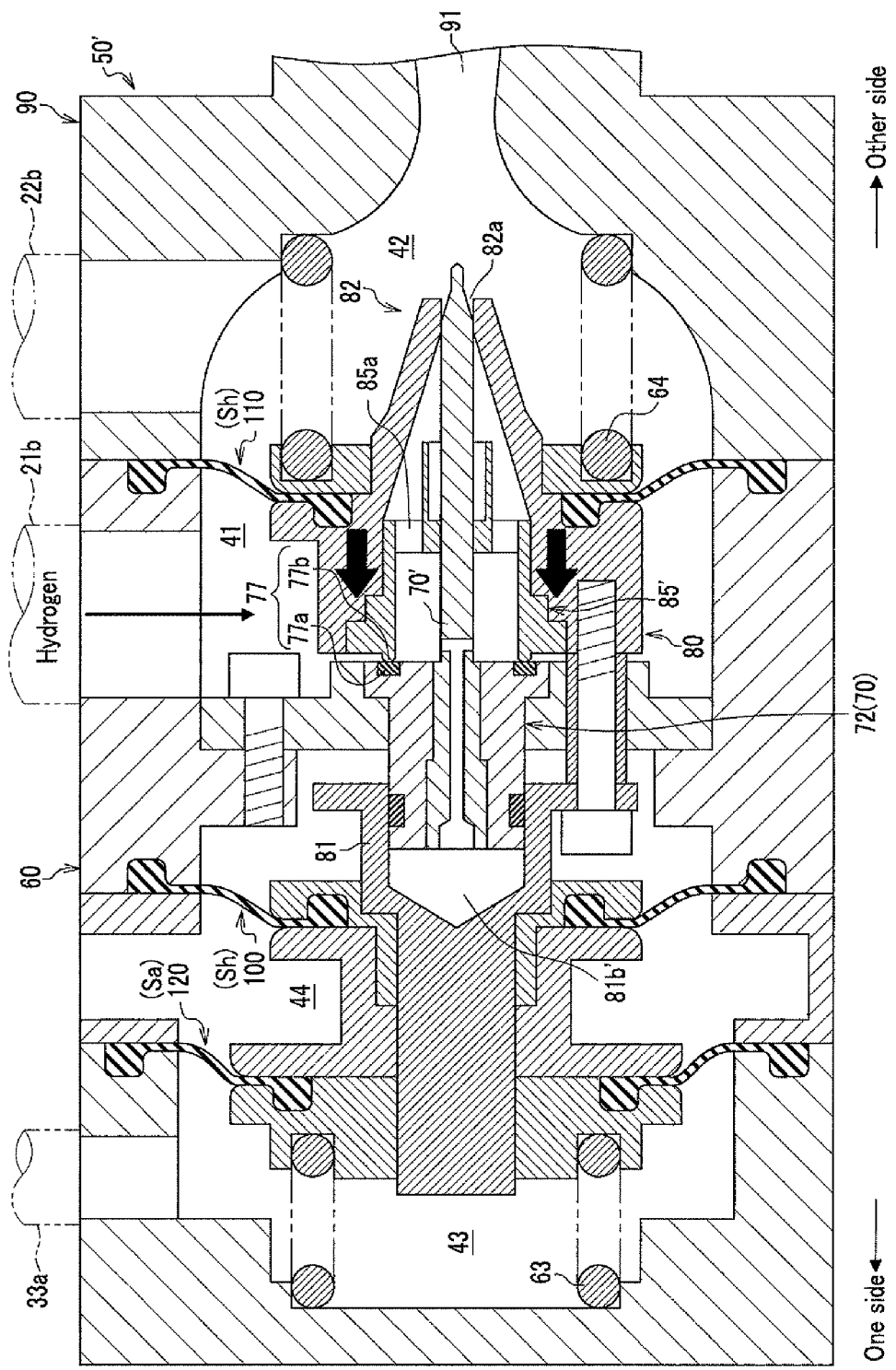
FIG. 8 is a cross sectional view showing a status of an ejector according to a modified example when a nozzle is moved to a side to close a valve.

In addition, as shown in FIG. 7 and FIG. 8, it may be configured such that using a solid needle 70', the needle 70' is supported by a bearing member 85' which has a hydrogen flow path 85a. In this case, a pressure of hydrogen given to the nozzle 80 from the first fluid chamber 41 through the valve 77 can also be compensated by a back pressure chamber 81b' which is formed between the needle 70' and the base end portion 81 of the nozzle 80, and it is possible to set so that a flow rate of hydrogen to be ejected is amplified against an amount of air supply, or contrary to this, the flow rate of hydrogen to be ejected is attenuated against the amount of air supply, based on the area ratio Sa/Sh, which is a ratio of the effective area Sa of the third diaphragm 120 to the effective area Sh of the first and the second diaphragms 100, 110.

Figure 9:
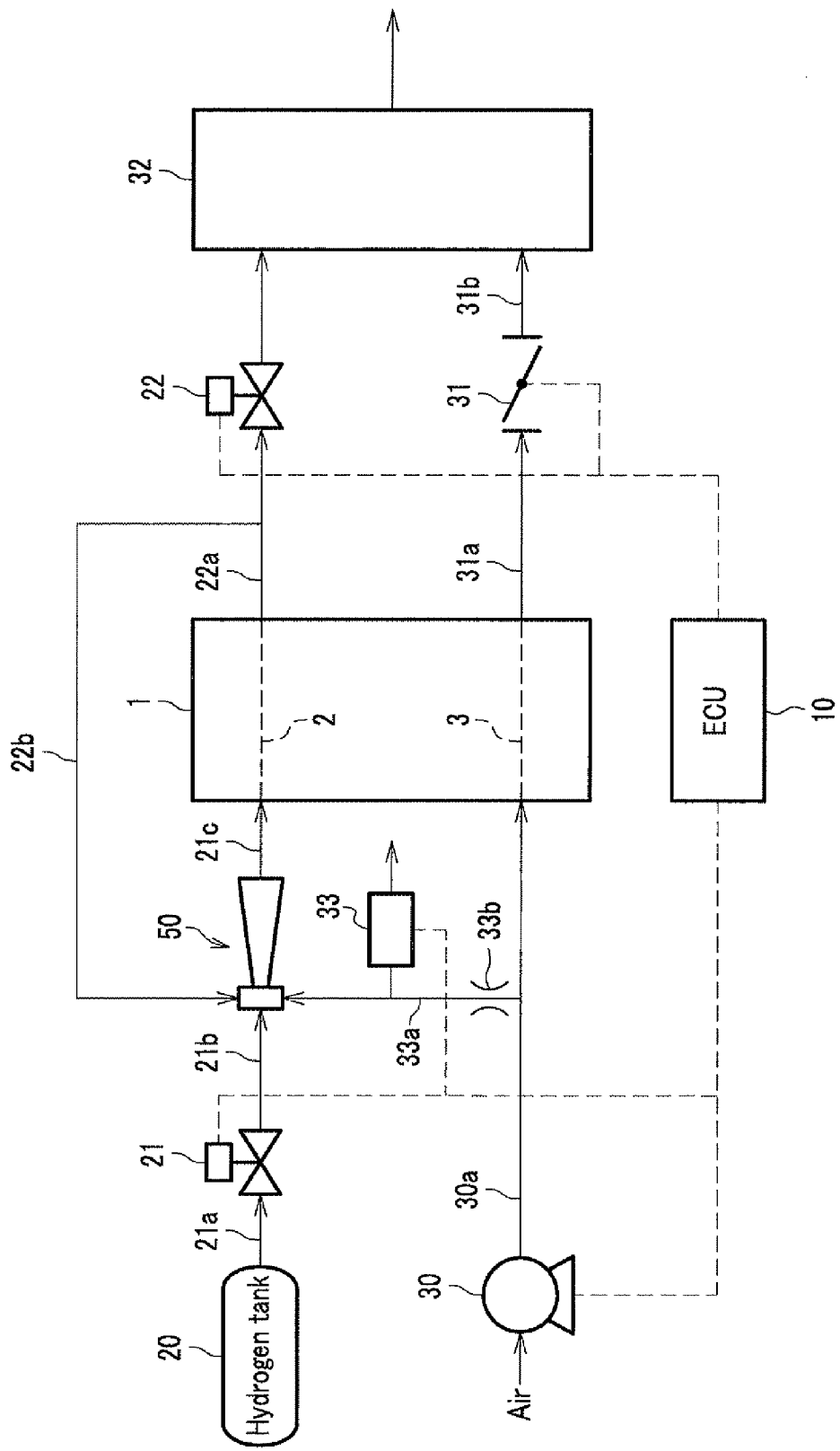
FIG. 9 is an illustration showing a configuration of another fuel cell system.

In addition, a pressure of air to be supplied to the third fluid chamber 43 may be adjusted by a control of the ECU 10 by disposing an orifice 33b, as shown in FIG. 9, in the air branch path 33a which is communicated with the third fluid chamber 43 of the ejector 50 and connecting an injector 33 (pressure adjusting means) for adjusting a pressure of air inside the air branch path 33a. Here, the injector 33 has a function to discharge air inside the air branch path 33a and a function to adjust a pressure of air inside the air branch path 33a by discharging the air.

Accordingly, a finer adjustment of a signal pressure may be conducted.

What is claimed is:

1. An ejector, comprising:
a body;
a nozzle to which a first fluid is supplied and having a trunk portion and a front end portion;
a needle which is coaxially arranged with the nozzle and having a base portion and a tip portion;
a diffuser which sucks a second fluid by a negative pressure generated by the first fluid ejected from the nozzle and discharges the second fluid and the first fluid by mixing the second fluid with the first fluid;
a first diaphragm and a second diaphragm whose periphery portions are fixed to the body, while being fixed to the nozzle on one side and the other side apart from the one side, respectively, and enabling the nozzle to move in an axial direction against the needle;
a third diaphragm whose periphery portion is fixed to the body on the one side which is further end side of the first diaphragm, while being fixed to the nozzle on the one side and enabling the nozzle to move in the axial direction against the needle;
a first fluid chamber which is surrounded at least by the first diaphragm, the second diaphragm and the body and to be supplied with the first fluid;
a second fluid chamber which is surrounded at least by the second diaphragm and the body and to be supplied with the second fluid;
a third fluid chamber which is surrounded at least by the third diaphragm and the body and to be supplied with a third fluid;
a fourth fluid chamber which is surrounded at least by the first diaphragm, the third diaphragm and the body and communicated with the atmosphere;
a valve which is formed in the first fluid chamber by disposing a valving element on one of the nozzle and the needle and a valve seat on the other one of the nozzle and the needle, wherein the valving element seats on or leaves from the valve seat by a movement of the nozzle; and a back pressure chamber which is disposed between the trunk portion of the nozzle and the base portion of the needle and is communicated with the first fluid chamber through the valve, wherein the first diaphragm and the second diaphragm have the same effective area; and wherein an effective area of the third diaphragm is different from the effective areas of the first diaphragm and the second diaphragm.

2. The ejector according to claim 1, wherein the effective area of the third diaphragm is larger than the effective areas of the first diaphragm and the second diaphragm.

3. A fuel cell system using the ejector according to claim 2, wherein the ejector is provided in a fuel circulation path which feeds a discharged fuel discharged from a fuel cell to the fuel cell again by mixing the discharged fuel with a fuel from a fuel supply source.

4. The fuel cell system according to claim 3, wherein an oxidant gas to be fed to the fuel cell is supplied to the third fluid chamber through a branch path, wherein a pressure regulation means for regulating a pressure of the oxidant gas is disposed in the branch path.

5. A fuel cell system using the ejector according to claim 1, wherein the ejector is provided in a fuel circulation path which feeds a discharged fuel discharged from a fuel cell to the fuel cell again by mixing the discharged fuel with a fuel from a fuel supply source.

6. The fuel cell system according to claim 5, wherein an oxidant gas to be fed to the fuel cell is supplied to the third fluid chamber through a branch path, wherein a pressure regulation means for regulating a pressure of the oxidant gas is disposed in the branch path.

\* \* \* \* \*